(No Model.) 2 Sheets—Sheet 1.
C. O. LUCE.
HORSE HAY RAKE.
No. 591,672. Patented Oct. 12, 1897.
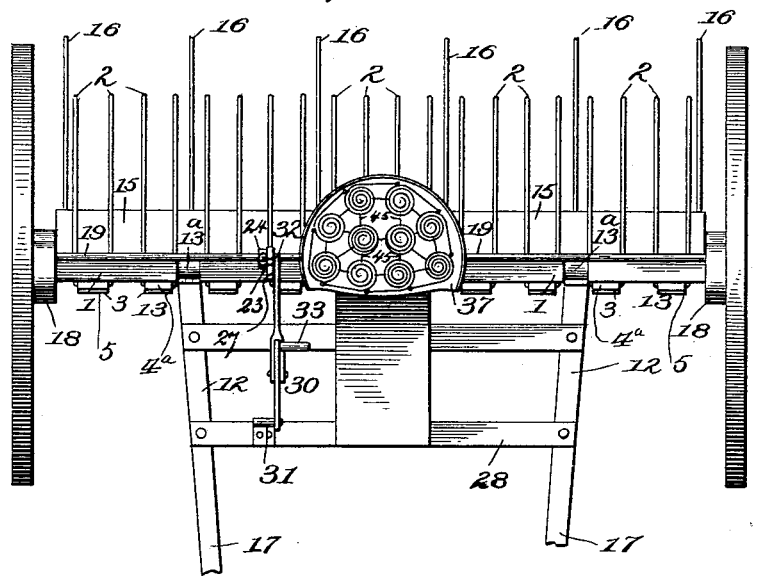
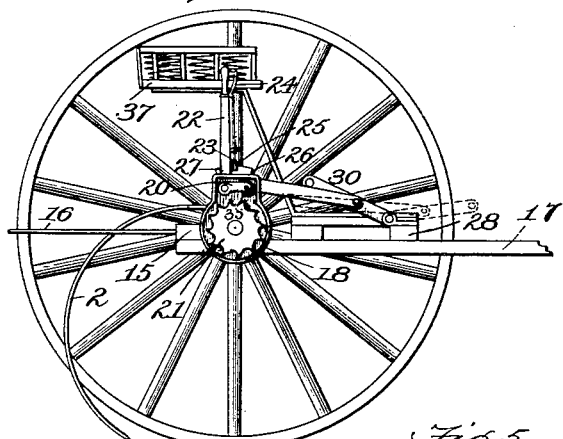
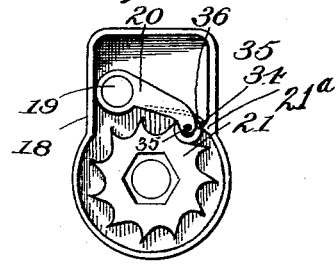
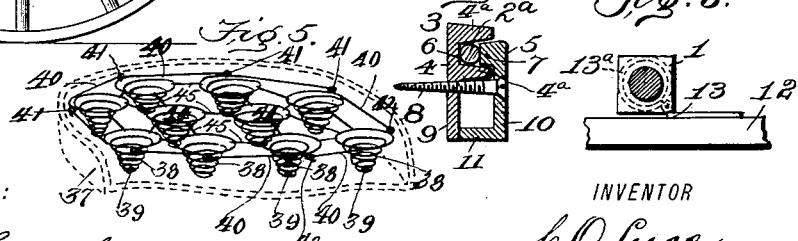
WITNESSES:
Edwin L. Bradford
Jas. W. White
INVENTOR
C. O. Luce
BY Knight Bros
ATTORNEY.

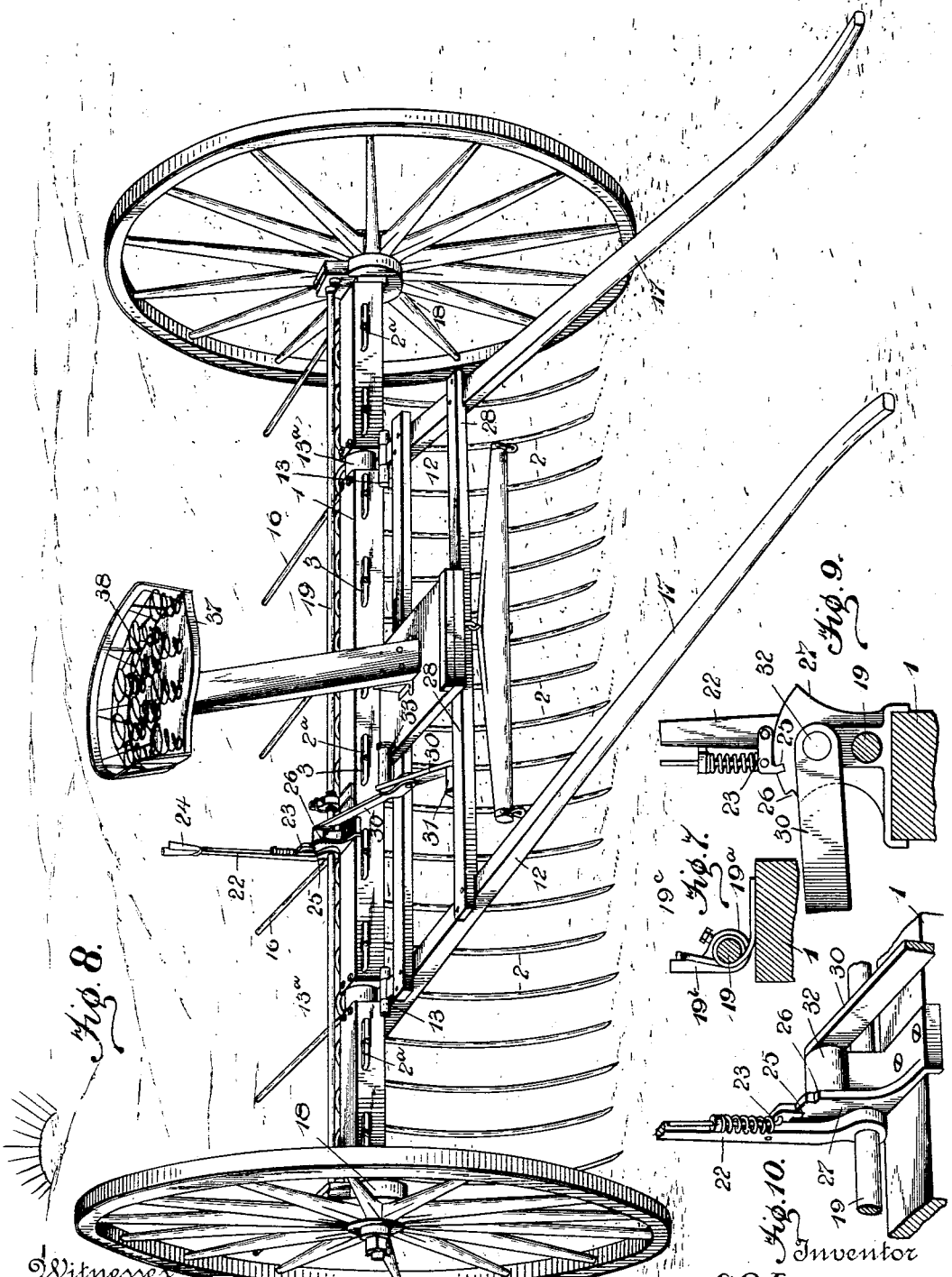

UNITED STATES PATENT OFFICE.

CURTIS O. LUCE, OF BRANDON, VERMONT.

HORSE HAY-RAKE.

SPECIFICATION forming part of Letters Patent No. 591,672, dated October 12, 1897.

Application filed July 20, 1896. Serial No. 599,891. (No model.)

*To all whom it may concern:*

Be it known that I, CURTIS O. LUCE, a citizen of the United States, and a resident of Brandon, in the county of Rutland and State of Vermont, have invented certain new and useful Improvements in Horse Hay-Rakes, of which the following is a specification.

My invention relates to automatically-dumping rakes wherein by the movement of a lever at will the teeth will be automatically raised through the stripping-bars until the load is dumped, after which the actuating mechanism is automatically released to allow the rake to return to normal position, means being also provided for holding it in such position.

My invention further relates to a new and improved clamp for the teeth and to novel details of construction which are employed in carrying out the several objects to be attained.

In carrying out my invention I employ an axletree to which the rake-teeth are attached by the improved clamp, consisting of two parts formed, respectively, with a tongue and groove between which the connecting portion of a pair of teeth is gripped and having extensions through which passes the securing screw or bolt; a body portion of the rake to which the axletree is hinged, so as to permit it to swing forward and raise and lower the teeth through clearing-bars projecting rearwardly from said body portion; boxes on the ends of the axletree; a shaft parallel with the axletree and having its ends projecting into the boxes; dogs fixed on the ends of said shaft and adapted to engage in ratchets turning with the wheels, so that when the dogs are depressed through the medium of a lever on said shaft the axletree will be thrown forward by rotation of the wheels sufficient to raise the teeth through the clearing-bars; a dog on the lever and a notched segment on the axletree for holding the dogs into the ratchets until the lifting-handle of said dog comes in contact with the body of the rake by the turning of the axletree with the shaft and segment, when the dog will be shifted back and the dogs withdrawn from the ratchets, and the rake can automatically return to normal position, which it does by reason of the hinged connection between the axletree and frame, and a toggle-lever controlled by a foot-rest and adapted to hold the rake in operative position when not dumping or to hold it in inoperative position when not in use.

My invention will be understood upon reference to the accompanying drawings, in which—

Figure 1 is a plan of the improved rake. Fig. 2 is a side elevation of the same with the near wheel removed. Fig. 3 is a detail view of the dumping-clutch. Fig. 4 is a detail view of the teeth-clamp. Fig. 5 is a perspective view of the spring-cushion for the seat, showing the latter in dotted lines. Fig. 6 is a detail view showing the hinge through which the draft is imparted located eccentrically to the axis of the wheels. Fig. 7 is a detail sectional view of the means whereby the lever-shaft is automatically returned to normal position. Fig. 8 is a perspective view of the machine. Fig. 9 is a detail perspective view of the hand-lever and adjacent parts. Fig. 10 is a detail side view thereof.

1 represents the axletree, upon which is mounted the usual form of teeth 2, which are connected in pairs with the prongs passing through the axletree and the connecting portions $2^a$, secured by the clamps 3, which are of novel construction. These clamps consist of the plates 4 5, provided, respectively, with tongues $4^a$, providing a groove 6, in which the connecting portion $2^a$ is seated, and a tongue 7 for clamping said portion in the groove 6. The parts of the clamp are secured together and the clamp held in place by means of screw 8 or its equivalent passing through the extensions 9 10 on the respective parts of the clamp, lug 11 being provided, preferably, on that part which carries tongue 7 to preserve the clamping-pressure between the parts. By thus making the screw or bolt pass through the clamp below the bearing of the teeth I am enabled to give greater length of bearing to the latter and allow the teeth to be set nearer together.

12 represents the frame of the rake, to which is connected the axletree 1 by means of hinges 13, secured at its lower forward edge by any suitable means—such, for instance, as straps $13^a$, encircling the axletree, as shown. At its rear end the frame 12 carries transverse bar 15, from which project the clearing-bars 16 for stripping the hay from the teeth. The frame also has the usual thills or shafts 17, by which the implement is drawn. As will be better understood upon reference to Fig. 2, the connection between the frame 12 and the axletree 1 is such as to permit the latter to rotate about forty-five degrees upon the frame. This motion is sufficient to dump the hay, and in order to effect this movement the axletree is provided with boxes 18 and a shaft 19, having its ends within said boxes provided with dogs 20, while ratchets 21, fixed so as to rotate with the wheels or one of them, are adapted to be engaged by said dogs.

22 represents a lever fast upon the shaft 19 and having a common form of spring-pressed dog 23, with releasing-handle 24. A toothed bracket or segment 27, fixed to the axletree, receives the dog 23 in notch 25 in rear of the shoulder 26, according to whether the dogs 20 are out of or into engagement with the ratchet 21. When the dog 20 is pressed into engagement with ratchet 21 by movement of the dog 23 in front of shoulder 26, the axletree is caused to rotate with the wheels, the lever 22 turning down with it, and the hay is dumped. As soon as the axletree is rotated a sufficient distance to dump the hay handle 24 comes in contact with the cross-bar 28 on the body of the rake and the dog 23 is released from the shoulder 26. The segment 27 continues to move, so as to bring the notch 25 into engagement with dog 23, and the dogs 20 are withdrawn from the ratchets 21 automatically by ordinary means, such as a spring $19^a$, which engages the lug $19^b$, adjustable by a set-screw $19^c$ on the lever-shaft, whereupon the axletree, with the rake, is automatically returned to normal position by reason of the hinge through which the draft is imparted being located eccentrically to the axis of the wheels.

30 represents a toggle-lever having its respective ends connected with a portion of the frame 12—such, for instance, as the cross-bar 28—and an upper portion of the axletree. (It may be conveniently attached to the segment 27, as shown at 32.) This toggle-lever has a foot-rest 33, by means of which the rake may be held in normal position in opposition to any tendency which it may have to rise, be thrown up into inoperative position when the implement is not in use and when driving from place to place, the toggle-lever being then in the position shown by dotted lines. It will be understood that the ratchet only elevates the rake so long as the axletree is forced to turn with the wheels, while the toggle-lever will hold the rake in elevated position, while leaving the wheels free to turn. To cause the dogs 20 to adjust themselves to the spaces between the teeth in the ratchets 21, said dogs are provided with rollers 34, mounted loosely upon pins 35 and held with a yielding pressure by spring 36. By this means when the dogs are forced into engagement with the ratchets the rollers can accommodate themselves to the spaces between the teeth and the lug $21^a$ on the ratchet boxing, and undue friction and rattling are avoided.

When the hand-lever is carried forward a certain distance, the hand-lever is locked, with the dog on the hand-lever, to the segment on the head, and at the same time carries the dog with the roller-clutch down into contact with the lug on the ratchet-case, and as the ratchet-wheel comes in contact with the roller it forms a perfect clutch and the rake-head is carried over about one-fourth of a circle, and at this point the spring at the end of the hand-lever strikes the cross-bar and throws the dog on the lever out of gear and also the rollers and allows the head and teeth to drop back to their working position. The object of the rollers working loose on the pin is to let the rollers adjust themselves to the ratchet and lug and to be thrown out of gear without much friction, and it works so easily that there is no side draft when it is thrown out of gear. The object of the roller is to do away with friction and wear.

37 represents the seat, which is built up of spiral springs 38, having central eyes 39, by which they are secured to the seat, and having at their upper ends extensions 40, each bent to form an eye or loop 41 adjacent to the top of the spring and then extending off in the direction of the outline of the seat, terminating in the hook 42. Each hook 42 engages in the eye 41 of the next spring, and the effect is to effectually connect the upper ends of the spring in the form which spaces them apart, as shown. The intermediate springs 44 are connected by guys 45 to the outer springs and to each other.

Having thus described my invention, the following is what I claim as new therein and desire to secure by Letters Patent:

1. A horse hay-rake comprising an axletree, a frame to which the axletree is hinged eccentrically a boxing secured to an end of the axletree, a ratchet-wheel located in the boxing and secured to a wheel, the lever-shaft having an end located in the boxing, the dog secured to the said end of the lever-shaft and having its outer end provided with a roller adapted to occupy a position between a ratchet-tooth and the boxing so as to lock the wheel to the axletree and to turn the latter on the frame, and a hand-lever secured to the lever-shaft for operating the dog; substantially as described.

2. A horse hay-rake comprising an axletree a bracket having notches and mounted on the axletree, a frame, to which the axletree is hinged eccentrically, having a cross-bar in front of the seat, a boxing secured to an end of the axletree, a ratchet-wheel located in the boxing and secured to a wheel, the lever-shaft having an end located in the boxing, the dog secured to the said end of the lever-shaft and having its outer end provided with a roller adapted to occupy a position between a ratchet-tooth and the boxing so as to lock the wheel to the axletree and turn the latter on the frame, and a hand-lever secured to the lever-shaft for operating the dog, carrying a dog adapted to engage the notches of the bracket and having a handle adapted to come in contact with the cross-bar for releasing the hand-lever; substantially as described.

3. A horse hay-rake comprising an axletree, a frame, to which the axletree is hinged eccentrically, a boxing secured to an end of the axletree, a ratchet-wheel located in the boxing and secured to a wheel, the lever-shaft having an end located in the boxing, the dog secured to the said end of the lever-shaft and having its outer end provided with a roller adapted to occupy a position between a ratchet-tooth and the boxing so as to lock the wheel to the axletree and to turn the latter on the frame, a hand-lever secured to the lever-shaft for operating the dog and means for returning the lever-shaft, ratchet-dog and hand-lever to normal position when the hand-lever is released; substantially as described.

4. The combination with the body, the axletree, the rake, and the wheels; of the ratchet and dog connected respectively with a wheel, and with the axletree, and means for controlling the movement of the dog; said dog comprising an arm and a loosely-pivoted spring-pressed antifriction-roller; substantially as described.

5. A horse hay-rake comprising an axletree, the paired teeth extending horizontally through the axletree and connecting portions located at the front side of the axletree, and the teeth-clamps each consisting of two inner and outer plates; the inner plate being formed with two forwardly-projecting tongues providing a groove in which the connecting portion of a tooth is seated, and with a pendent extension, and the outer plate being formed with an inwardly-projecting tongue, fitted to the connecting portion and with a pendent extension having a lateral lug bearing against the extension of the inner plate and means extending through the extensions of the plates for securing the plates together and to the front side of the axletree; substantially as described.

6. A horse hay-rake comprising an axletree, a bracket having notches and mounted on the axletree, a frame to which the axletree is hinged eccentrically, having a cross-bar in front of the seat, a boxing secured to an end of the axletree, a ratchet-wheel located in the boxing and secured to a wheel, the lever-shaft having an end located in the boxing, the dog secured to the said end of the lever-shaft and having its outer end provided with a roller adapted to occupy a position between a ratchet-tooth and the boxing so as to lock the wheel to the axletree and turn the latter on the frame, a hand-lever secured to the lever-shaft for operating the dog carrying a dog adapted to engage the notches of the bracket and having a handle adapted to come in contact with the cross-bar for releasing the hand-lever, means for returning the lever-shaft, ratchet-dog, and hand-lever to normal position, when the hand-lever is released, and the toggle-lever having a foot-rest and pivoted to the bracket and to the cross-bar at its respective ends for assisting the hand-lever in the tilting of the axletree; substantially as described.

CURTIS O. LUCE.

Witnesses:
S. W. JONES,
MASON A. WHITE.